F. W. LUSCOMB.
MACHINE FOR INSERTING EYELETS.
APPLICATION FILED NOV. 6, 1909.
956,119.  Patented Apr. 26, 1910.
4 SHEETS—SHEET 4.
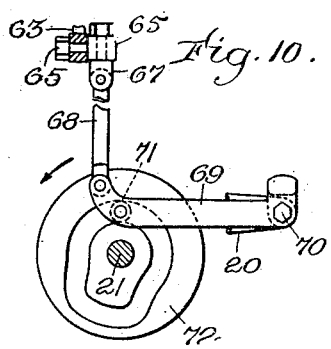
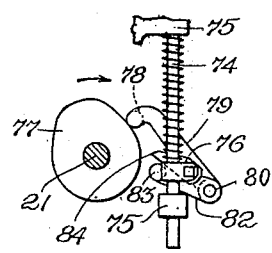
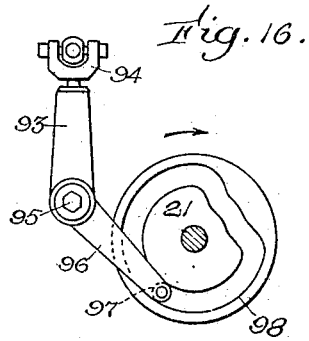
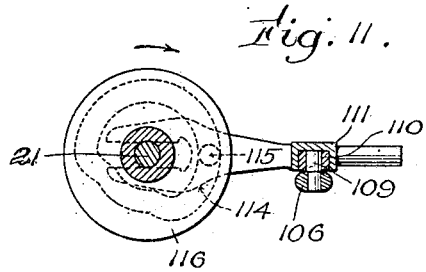
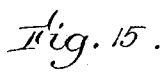
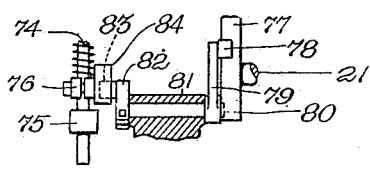
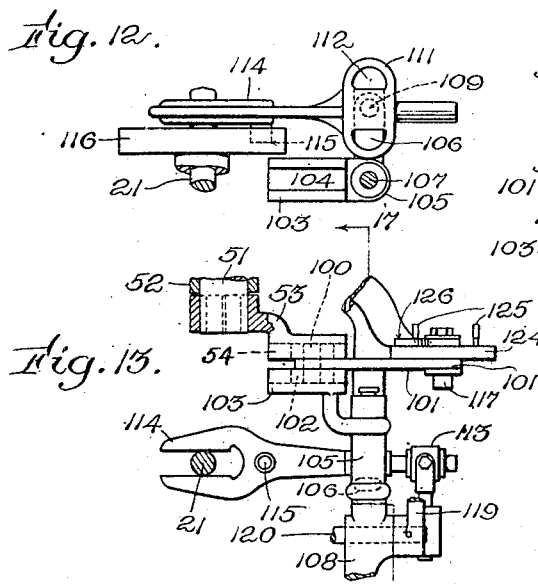
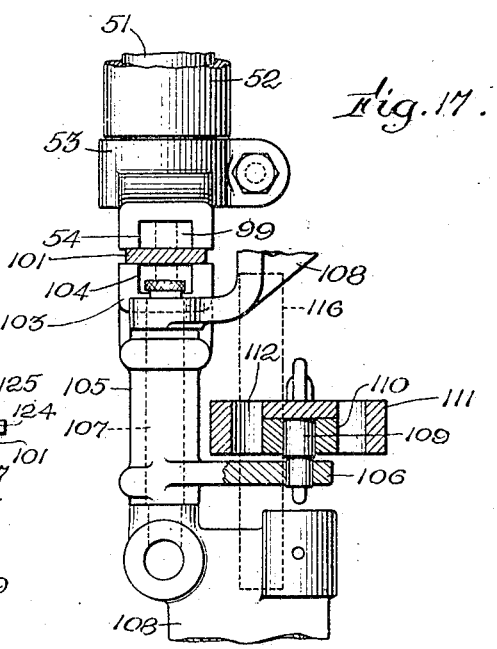
Witnesses:
F. R. Rowletou
P. N. Pezzetti
Inventor:
Frederick W. Luscomb
by Leighton Brown Dumby May
Attorneys

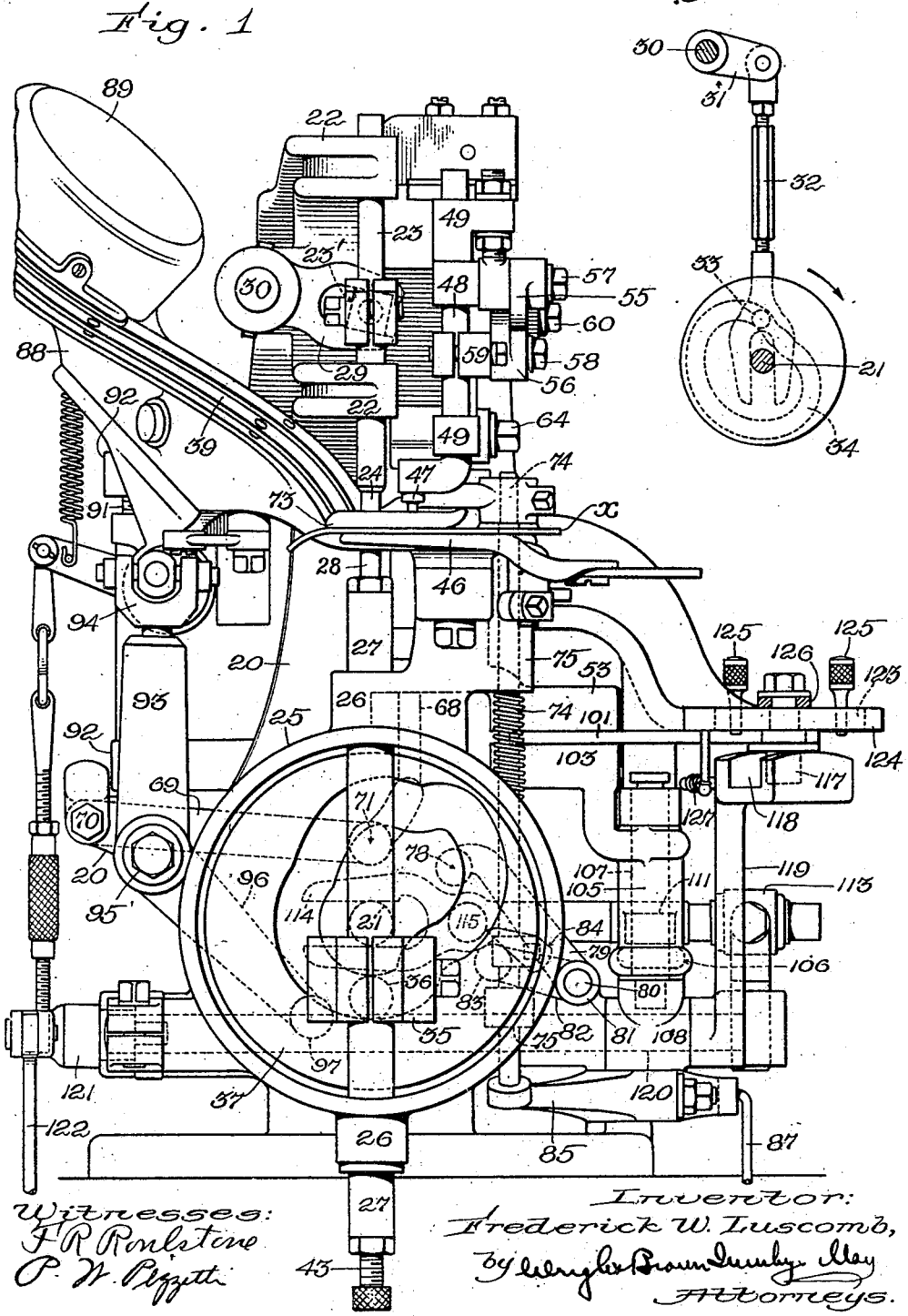

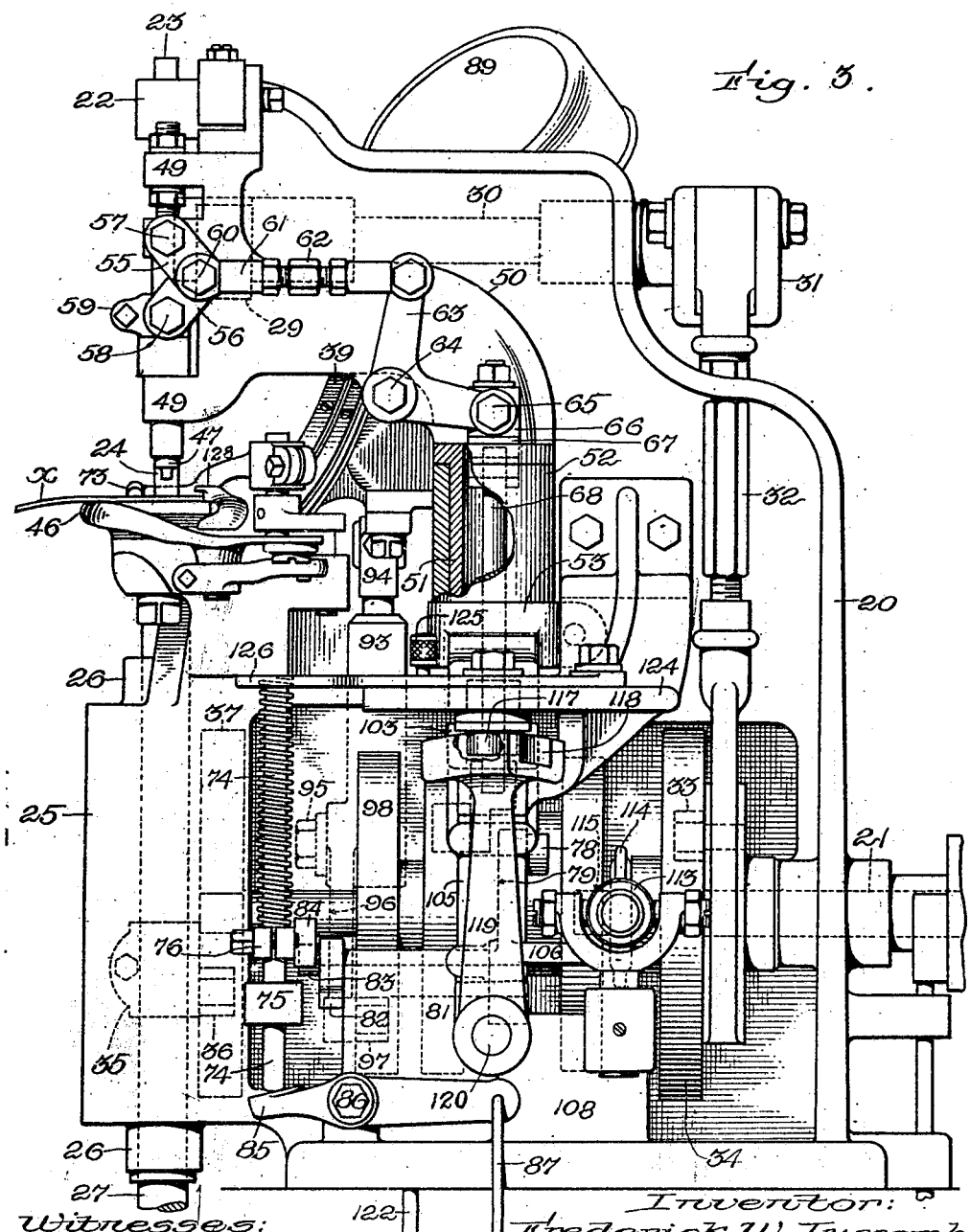

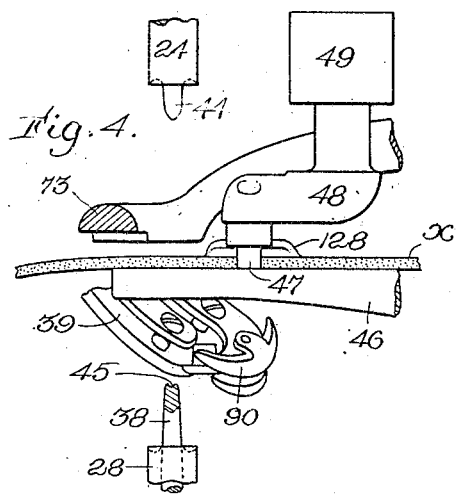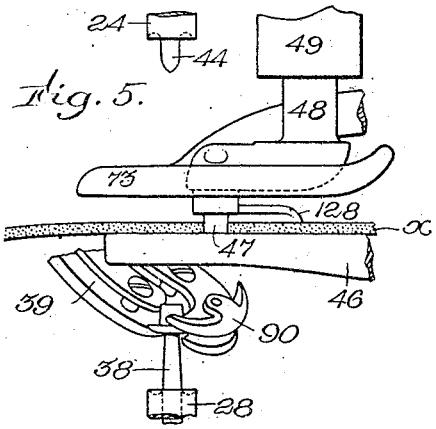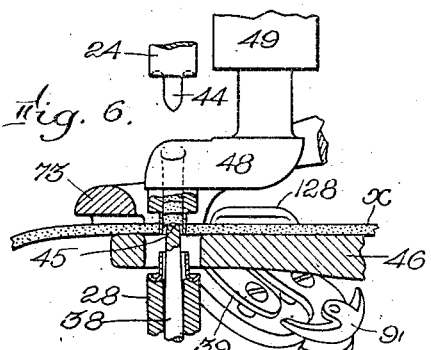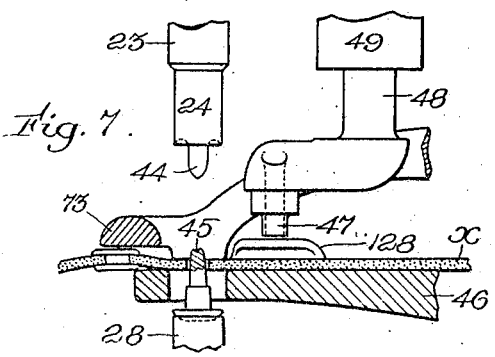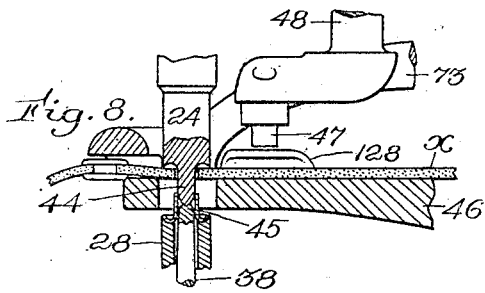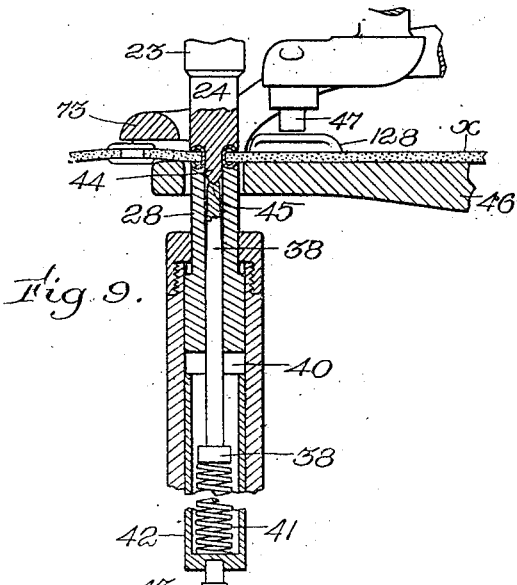

UNITED STATES PATENT OFFICE.

FREDERICK W. LUSCOMB, OF NEW BEDFORD. MASSACHUSETTS. ASSIGNOR TO ATLAS TACK COMPANY. OF FAIRHAVEN. MASSACHUSETTS, A CORPORATION OF NEW JERSEY.

MACHINE FOR INSERTING EYELETS.

956,119.   Specification of Letters Patent.   Patented Apr. 26, 1910.

Application filed November 6, 1909. Serial No. 526,520.

*To all whom it may concern:*

Be it known that I, FREDERICK W. LUSCOMB, of New Bedford, in the county of Bristol and State of Massachusetts, have invented certain new and useful Improvements in Machines for Inserting Eyelets, of which the following is a specification.

This invention relates to machines for inserting and setting eyelets such as shoe eyelets, and the machine in which the present invention is embodied is of the same general character as the machine illustrated in my co-pending application filed December 5, 1908. Serial No. 466,098.

The present invention relates chiefly to the means for cutting a hole in the work and the means for inserting an eyelet in the hole and setting the eyelet.

The principal object of the present invention is to so organize and actuate the above-named means to the end that the possibility of giving a false stroke or of imperfectly setting the eyelet may be avoided and consequently that the general character of the work performed by the machine may be of the best quality.

Before proceeding to the details of the present invention, it will be well to briefly explain the analogous features of said co-pending application in order that it may be clearly understood in what particulars the present invention differs and to what causes the improved results may be attributed. In said co-pending application, the upper and lower sets move toward and from each other in fixed alinement and they are not employed for feeding the work. The work is supported upon a cutting table which is provided with an aperture in which the setting operation occurs. The work, when supported upon the cutting table, is engaged by a tubular cutter which cuts through the work at a relatively distant point with relation to the line of the sets and which moves into the line of the sets while in the work and which recedes from the work in the line of the sets leaving the hole in position to receive an eyelet. A disadvantage of this form of mechanism is that, during the period between the time when the cutter leaves the work and the time when the eyelet is inserted in the hole, the hole is unoccupied and the work is held in operative position solely by a presser foot. A disadvantage of leaving the work with the hole unoccupied is that the work is subject to slight displacement whereby the hole may be removed from the line of the sets. The result of such displacement is that the eyelet, upon being inserted into the work, often becomes crushed in the leather surrounding the hole, and the work is thereby rendered unfit for use.

The present invention seeks to avoid possibility of injuring the work by inserting an eyelet at any point except in the hole intended to receive it.

In carrying out the invention, the cutting member and the two setting members are so operated and timed with relation to each other that work is positively engaged by one or the other of said members from the time when the cutter first enters the work until the eyelet is completely set. By reason of this arrangement and operation of the several members, absolute reliance upon the presser foot is unnecessary inasmuch as the work is at all times held positively in the desired position.

Other features of novelty are illustrated upon the accompanying drawings and explained in the following specification.

Of the drawings, which illustrate one form in which the invention may be embodied,—Figure 1 is a front elevation of a machine for inserting eyelets. Fig. 2 is a detail of cam mechanism for actuating the upper set. Fig. 3 is a right side elevation of the machine. Figs. 4 to 9 represent front elevations, partly in section, of the eyelet-inserting and work-cutting and feeding members in progressive positions. Fig. 10 is a detail of cam mechanism for imparting the cutting stroke to the cutter. The direction of this view is from rear to front. Fig. 11 is a detail of cam mechanism for imparting a feeding stroke to the cutting member. This view is in the direction from front to rear. Fig. 12 is a top plan view of the mechanism of Fig. 11. Fig. 13 is a view similar to Fig. 11 omitting the cam and including other elements of the feeding mechanism. Fig. 14 is a detail of cam mechanism for lifting the presser-foot. Fig. 15 is a side elevation partly in section of the mechanism of Fig. 14. Fig. 16 is a detail of cam mechanism for vibrating the inclined race way. Fig. 17 is a section on line 17—17 of Fig. 13 on a larger scale.

The same reference characters indicate the same parts wherever they occur.

Referring first to Figs. 1 and 3, the frame of the machine is indicated by the numeral 20; said frame being formed with suitable bearings for a prime power shaft 21. The frame is provided with an overhanging portion which provides bearings 22 for the vertically movable holder 23, at the lower end of which is the upper set 24. The lower part of the frame is formed with a cylindrical housing 25 and bearings 26 which guide a carrier 27, at the upper end of which is the lower set 28. The upper and lower carriers 23 and 27 are reciprocated toward and from each other but their movements are not in unison but on the other hand are irregular or intermittent for a purpose hereinafter explained.

The means for actuating the upper carrier is illustrated by Figs. 1 and 2 in which 23' represents a swiveled block mounted on the carrier 23. The block is embraced by a forked arm 29 affixed at the forward end of a rockshaft 30. The rockshaft is journaled in bearings in the frame 20 and has an arm 31, (see Figs. 2 and 3) affixed at its rear end. The free end of the arm 31 is pivotally connected to a thrust rod which includes a turn buckle 32. The lower end of the thrust rod is forked and embraces the power shaft 21. It is provided with a stud 33 which coöperates with a cam 34 affixed upon the shaft 21.

The means for actuating the lower carrier 27 is shown by Figs. 1 and 3 and includes a block 35 adjustably clamped upon the carrier and provided with a cam roll 36 which coöperates with a cam 37 inclosed within the housing 25 and affixed at the forward end of the driving shaft.

The lower carrier is provided with a spindle 38 in addition to the set 28. The carrier is formed with a socket 40 in which is placed a cup 42. The base of the set 28 occupies the socket above the cup and is movable in the socket and is adapted to be seated upon the top edge of the cup, when clenching an eyelet. The carrier 27 is provided with an adjusting screw 43 which bears against the bottom of the cup and which is adapted to adjust the cup for the purpose of varying the position of the seat for the set 28 to adapt the set to leather of various thicknesses. The set 28 is centrally bored and is occupied by the spindle 38. The inner end of the spindle has a head 38' and a spring 41 which is interposed between said head and the bottom of the cup normally elevates the spindle and by reason of the head 38' also elevates the set 28 above its seat. The upper set 24 is provided with a central projection 44 which is adapted to enter a depression 45 in the upper end of the spindle and to depress the spindle in the manner hereinafter explained.

A stationary work table or cutting table is indicated at 46. The work which is indicated at x, when supported on the cutting table is adapted to be cut and fed toward the setting members by a tubular cutting and fitting member 47. The member 47 is affixed to a plunger 48 which is adapted to slide in guides 49 formed upon an oscillatory feed carriage 50. (Fig. 3.) The carriage is oscillated back and forth to move the member 47 to and from the line of the setting members and the plunger 48 is reciprocated toward and from the cutting table to impart a cutting stroke to the member 47 and to retract it from the work. The feed carriage 50 is formed with a hollow sleeve or hub 51 which is mounted in a boss or bearing 52 formed upon the frame 20. The lower end of the sleeve 51 is provided with a rigid arm 53 in which is formed a groove 54, (Fig. 17) adapted to receive a stud by which the arm may be oscillated.

The means for reciprocating the plunger 48 toward and from the cutting table is shown by Fig. 3 and includes toggle links 55 and 56. The link 55 is pivoted at 57 to a portion of the feed carriage 50 and the link 56 is pivoted at 58 to a collar 59, rigidly attached to the plunger 48. The pivot 60 by which the toggle links are joined serves also to connect them with an extensible link 61 including a turn buckle 62. The link 61 is pivotally connected to a bell crank 63 which is pivoted at 64 to the carriage 50. The other arm of the bell crank, (see also Fig. 10) is pivotally connected at 65 to a block 66 which is swiveled upon another block 67 which is contained within the hollow sleeve 51 of the carriage. The block 67 is pivotally connected to one end of the plunger 68 which extends through the sleeve 51 and which is otherwise pivotally connected to a cam arm 69 whose fulcrum 70 is supported by an arm of the frame 20. The arm 69 is provided with a cam roll 71 which coöperates with a cam 72 affixed upon the shaft 21.

The mechanism by which the carriage 50 is oscillated to effect the feeding of the work and by which the length of the feeding stroke may be varied, forms no part of the present invention, and the detailed description thereof is postponed.

A presser foot for clamping the work x upon the cutting table 46 is indicated at 73 and is affixed at one end of a plunger 74. The plunger is mounted in guides 75 (see Fig. 14) and is provided with a collar 76. A helical spring coiled about the plunger between one of the guides 75 and the collar 76 exerts its tension to normally hold the presser foot against the cutting table, but the presser foot is positively raised at the appropriate times by a cam 77 affixed upon the shaft 21. The cam engages a roll 78 carried at the free end of an arm 79 which is affixed upon a rockshaft 80. The rockshaft is mounted in a bearing 81 in the frame 20 and is provided with another arm 82 at the free end of which is a roll 83. The roll is adapted to engage an inclined face of a finger 84 formed upon the collar 76 and to thus raise the collar to lift the presser foot. The presser foot may be manually raised by the lever 85 which is adapted to engage the lower end of the plunger 74.
(See Figs. 1 and 3.) The lever 85 is mounted upon a pivot 86 supported by the frame 20 and it is provided with a rod 87 by which it may be connected to a treadle, not shown.

The race 39 is mounted upon an oscillatory base 88 which also supports a reservoir 89 by which eyelets are supplied to the race. Any preferred mechanism may be employed for feeding eyelets from the reservoir to the race and inasmuch as mechanism of this kind forms no part of the present invention, it is omitted from the drawings. The race is inclined and is provided at its lower end with a pivoted yielding finger 90 which normally closes the mouth of the race but which is adapted to be deflected to permit the removal of an eyelet and which is deflected by the eyelet. The base 88 which supports the race and the reservoir is mounted upon trunnions 91 which bear in ears 92 formed upon the frame 20. By reason of this form of mounting, the delivery end of the race is adapted to swing in a horizontal plane. Suitable mechanism hereinafter described is provided for oscillating the base 88 so as to move the delivery end of the race to and from alinement with the setting members. The lower end of the race is in a plane between the lower limit of movement of the spindle 38 and the table 46, and the race is so actuated as to place the foremost eyelet in the path of the spindle when the spindle is at its lowest position. As the spindle rises, it enters the throat of the eyelet, and the race is immediately moved to one side thereby causing the removal of the eyelet from the race. The eyelet thereupon drops upon the lower set 28 where it remains until ultimately inserted in the work.

The order of operations of the cutting and feeding member 47 and of the upper and lower sets is as follows: When the setting members are open as shown by Fig. 4, the cutting member is giving a cutting stroke while relatively distant from the line of the setting members. The cutting stroke is effected as hereinbefore explained by the toggle links 55 and 56. The movement imparted to the toggle links is such as to carry the pivot 60 across and slightly beyond the line of the pivots 57 and 58, thereby fully depressing the cutting member and slightly relieving the pressure of the cutting member upon the cutting table. After the cutting member has thus been actuated to cut a hole in the work and to relieve the pressure upon the cutting table, the feed carriage is moved to carry the cutting member into the line of the setting members, the cutting member meanwhile remaining in the work as shown by Fig. 4. During the cutting and feeding of the work, the spindle 38 removes an eyelet from the race as shown by Fig. 5. The cutting member, upon arriving at the line of the setting members, remains stationary until the lower carrier 27 has risen so far as to project the spindle 38 into the bore of the cutting member as shown by Fig. 6. The spindle may be slightly depressed into its carrier by reason of engagement with the disk severed from the work and contained within the cutting member. But when the cutting member rises, the spindle, if depressed, follows the cutting member in its upward movement until the head 38' (Fig. 9) of the spindle engages the lower end of the set 28. The lower set and spindle then remain in the position shown by Fig. 7 while the cutting member rises and moves to one side. After the removal of the cutting member, the upper set descends to its lowest point as shown by Fig. 8. In this position the central projection 44 enters the depression 45 in the end of the spindle and depresses the spindle to the position shown by Fig. 8. The projection 44, therefore, enters the work and also slightly enters the throat of the eyelet. The upper set remains in the position shown by Fig. 8 while the lower set is given a final upward stroke. The result of the final upward stroke is that the shank of the eyelet is inserted in the work being guided by the projection 44 of the upper set and the shank of the eyelet is ultimately clenched as shown by Fig. 9. After the clenching of the eyelet, the sets move to their respective distant positions where they remain, while the cutting member is again actuated to cut and feed the work.

As shown by Fig. 1, the base 88 is adapted to be oscillated upon its trunnions by a lever 93, which is connected to the base through a universal joint indicated at 94. The lever is pivoted at 95 and has an arm 96 at the free end of which is a cam roll 97 coöperating with a cam 98 upon the shaft 21. (See also Fig. 16.)

The mechanism for imparting a feeding stroke to the cutting member 47 is a form of well known mechanism by which length of the feeding stroke may be varied and by which one limit of the feeding stroke is rendered invariable. It will be readily understood that the invariable limit is that at which the cutting member stands in the line of the setting members. The feeding mechanism is illustrated in detail by Figs. 11, 12, 13, and 17. The arm 53 which is affixed at one end of the sleeve 51 is engaged by a sliding block 99 which occupies the groove 54 of said arm. The block is swiveled upon a stud 100 which extends through a link 101 and through a similar sliding block 102. The block 102 engages an arm 103 which is formed with a groove 104 to receive the block. The arm 103 is formed upon a sleeve 105 which has a second arm 106. The sleeve is pivoted upon a stud 107 mounted in brackets 108 on the frame 20. The arm 106 carries a stud 109 upon which is mounted a block 110. The block 110 engages a plunger 111 which is formed with a recess 112 to receive the block. The recess extends transversely of the plunger as shown by Figs. 11 and 12. One end of the plunger is mounted to slide in a bearing 113 and the other end is in the form of a fork 114 and embraces the shaft 21. A cam roll 115 carried by the plunger coöperates with a cam 116 affixed upon the shaft. By this means the arm 103 is oscillated and movement of said arm is transmitted to the arm 53 of the feed carriage through the connecting stud 100. The grooves in the arms 53 and 103 are parallel when the cutting member 47 is in the line of the setting members. The degree of movement imparted to the feed carriage may be varied by shifting the stud 100 longitudinally of the grooves 54 and 104, and the link 101 is provided for this purpose. The link is connected to a stud 117 of which one end projects into a cam groove 118 formed in an oscillatory cam arm 119 (Fig. 1). The arm 119 is affixed upon a rockshaft 120 which is mounted in bearings in the frame 20 and which is provided with a second arm indicated at 121. A rod 122 is attached to the arm 121 and may be connected to a treadle, not shown. By the mechanism last described it may be seen that the feeding stroke of the carriage 50 may be varied.

The machine may also include means for determining the minimum and maximum lengths of the feeding stroke and such means appears in Figs. 1 and 13. The other end of the stud 117 extends through a slot 123 in a fixed plate 124. The plate is provided with stop pins 125 and the stud 117 may be provided with a cross bar or other member 126 adapted to abut against the stop pins. The stop pins are arranged one on either side of the cross bar and the cross bar is adapted to move back and forth between the pins. The plate 124 may be provided with an unlimited number of apertures adapted to receive the stop pins, said apertures being preferably arranged to provide for more or less movement of the cross bar 126. If desired, spring 127 may be attached to the cam arm 119 for the purpose of holding the cross bar 126 against one of the stop pins.

Figs. 3 to 9 show a work guide 128 adapted to be engaged by an edge of the work and to guide the work with relation to the cutting member.

Having thus explained the nature of my said invention and described a way of making and using the same, although without attempting to set forth all of the forms in which it may be made or all of the modes of its use, I declare that what I claim is:

1. In a machine for inserting eyelets, eyelet inserting means, and separate independent work cutting and feeding means which remains in the work after first entering the same until after entrance by said inserting means.

2. In a machine for inserting eyelets, eyelet inserting and setting means, and independent work cutting and feeding means, said means coöperating to effect continuous transfixion of the work from the initial penetration by the cutting means until the completion of a setting operation.

3. In a machine for inserting eyelets, coöperative setting members having central spindles which project toward each other, one of said spindles being yielding and adapted to recede, cutting and feeding means, and actuating means for said setting members and cutting and feeding member for causing the cutting and feeding member to enter and feed the work, for causing one of said setting members to project its spindle through the work prior to retraction of the cutting and feeding member, for causing the other setting member to move to operative position prior to retraction of the first setting member, and for causing the first setting member to move to operative position prior to retraction of the other setting member.

4. In a machine for inserting eyelets, laterally fixed eyelet inserting and setting means, and independent work cutting and feeding means which remains in the work after first entering the same until after entrance by the inserting means, said inserting and setting means remaining in the work after first entering the same until after completion of the setting operation.

5. In an eyelet setting machine, a cutting and feeding member which remains in the work during cutting and feeding and during a period of inoperation following the feeding stroke, and which then recedes and moves laterally, a lower set which has preliminary and a final movement toward operative position and which pauses between said movements, and whose preliminary stroke ends after the feeding stroke and prior to the receding of the feeding member, a yielding spindle carried by said setting member, said spindle entering the work during the preliminary stroke of said setting member, an upper setting member which moves to operative position after said lateral movement of the feeding member and prior to the final stroke of the lower setting member, and which remains in operative position during the final stroke of the lower setting member, and a rigid spindle carried by the upper setting member, said rigid spindle abutting against said yielding spindle and forcing it out of the work.

In testimony whereof I have affixed my signature, in presence of two witnesses.

FREDERICK W. LUSCOMB.

Witnesses:
W. P. ABELL,
P. W. PEZZETTI.